INVENTOR.
GABOR P. KALMAN
BY
ATTORNEY

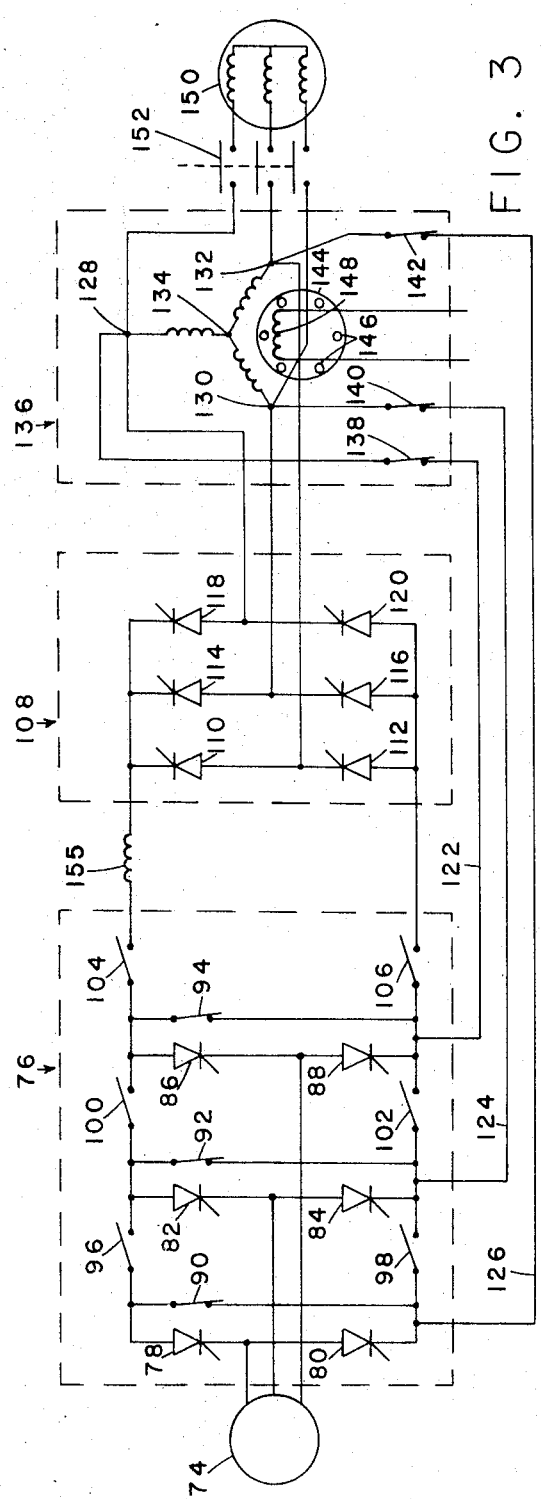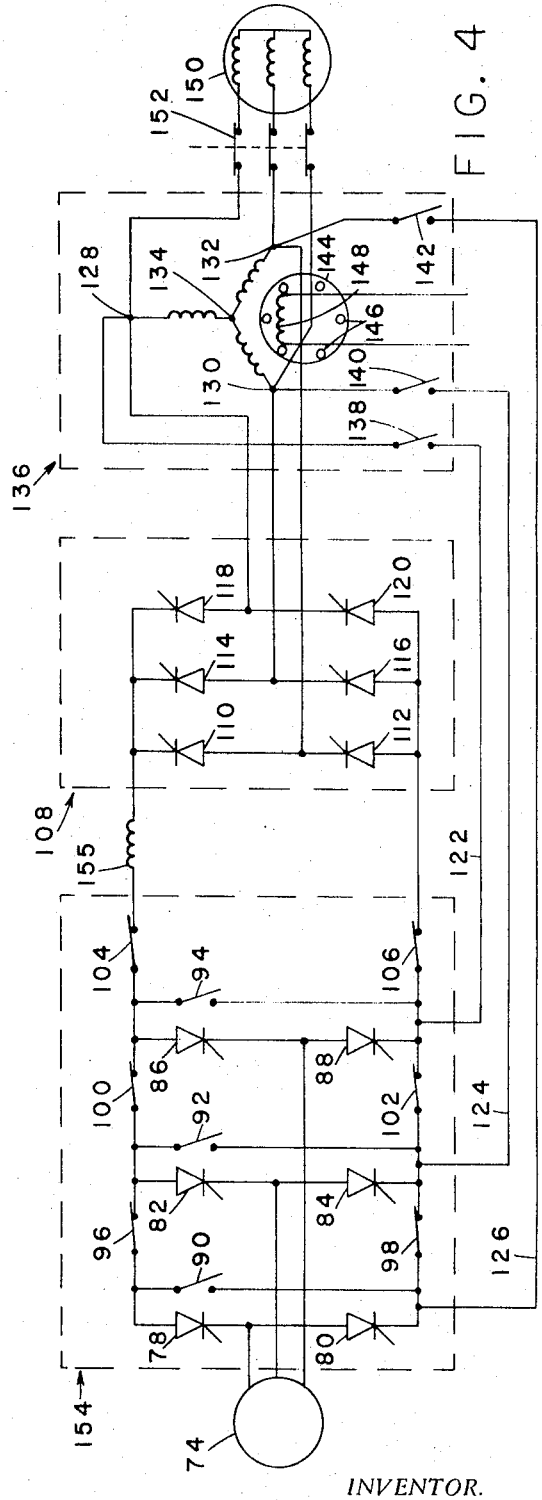

United States Patent Office 3,555,396
Patented Jan. 12, 1971

3,555,396
SELF-STARTING POWER CONVERTER
Gabor P. Kalman, Palos Verdes Peninsula, Calif., assignor to The Garrett Corporation, Los Angeles, Calif., a corporation of California
Filed May 2, 1969, Ser. No. 821,368
Int. Cl. H02m 5/40
U.S. Cl. 321—2                                             10 Claims

ABSTRACT OF THE DISCLOSURE

A starting system for a synchronously commutated power conversion unit. During start-up a bridge rectifier is connected and operated as an AC regulator to provide a variable reduced voltage to the synchronous condenser. After start-up the bridge rectifier is reconnected as a phase delay rectifier.

BACKGROUND OF THE INVENTION

The advent of high power thyristor semiconductor devices has renewed interest in variable speed AC drives and power conversion. For almost all industrial and transportation applications, the most easily available power is 60 Hz., single-phase or three-phase AC. Direct utilization of this power by providing a variable frequency output for variable speed AC drives is the function of the power conversion equipment.

Presently, the only practical way to do this is to rectify the 60 Hz. power and then invert the resulting DC. The problem is that while thyristors can be easily triggered-on with low power level signals, they require a relatively large stored energy source to provide the turn-off power. If the stored energy is released by a capacitor bank, the inverter is referred to as "forced commutated." This term indicates that turning off the thyristors is a result of discharging the capacitors, which creates significant voltage and current transients.

"Synchronous commutation" of the inverter prevents such an abrupt turn-off process. The latter term sometimes also called line or natural commutation, refers to the condition when stored energy for turning off the thyristors is supplied by a sinusoidal source on the AC side of the inverter. A synchronous condenser (e.g., an overexcited synchronous generator) is such a source.

The concept of synchronous commutation has been developed in connection with the transmission of power through high voltage DC (HVDC) lines. Using mercury-arc valves in the power conversion unit, the HVDC transmission is by now a well proven scheme for transmitting large amounts of power over a long distance. Experimental transmission lines and power conversion units capable of supplying up to 500 mw. are now under consideration.

The development of thyristors which are capable of handling large amounts of power at high voltages has made possible many of these advances in power conversion units. The lack of a self-starting capability has however been a critical factor in preventing more general use of the synchronously commutated systems. The present invention provides a self-starting capability to enable the advantageous utilization of a synchronously commutated system.

SUMMARY OF THE INVENTION

The self-starting power converter is comprised of a synchronous condenser, an inverter, and a third circuit component capable of acting either as an AC regulator or phase delay rectifier depending upon the configuration in which it is connected to the other circuit components. The converter is started by supplying a single or 3-phase AC voltage to the third component connected as an AC regulator which provides a variable reduced voltage to the synchronous condenser.

The AC regulator is then reconnected as a phase delay rectifier after the synchronous condenser starts up asynchronously on its damper winding and a DC excitation to the synchronous condenser field is applied.

BRIEF DESCRIPTION OF THE DRAWINGS

FIG. 3 is a circuit diagram of the self-starting power converter in the starting mode when supplied by a three-phase AC voltage.

FIG. 4 is a circuit diagram of the self-starting power converter of FIG. 3 in the running mode.

DESCRIPTION OF THE PREFERRED EMBODIMENTS

Figure 1:
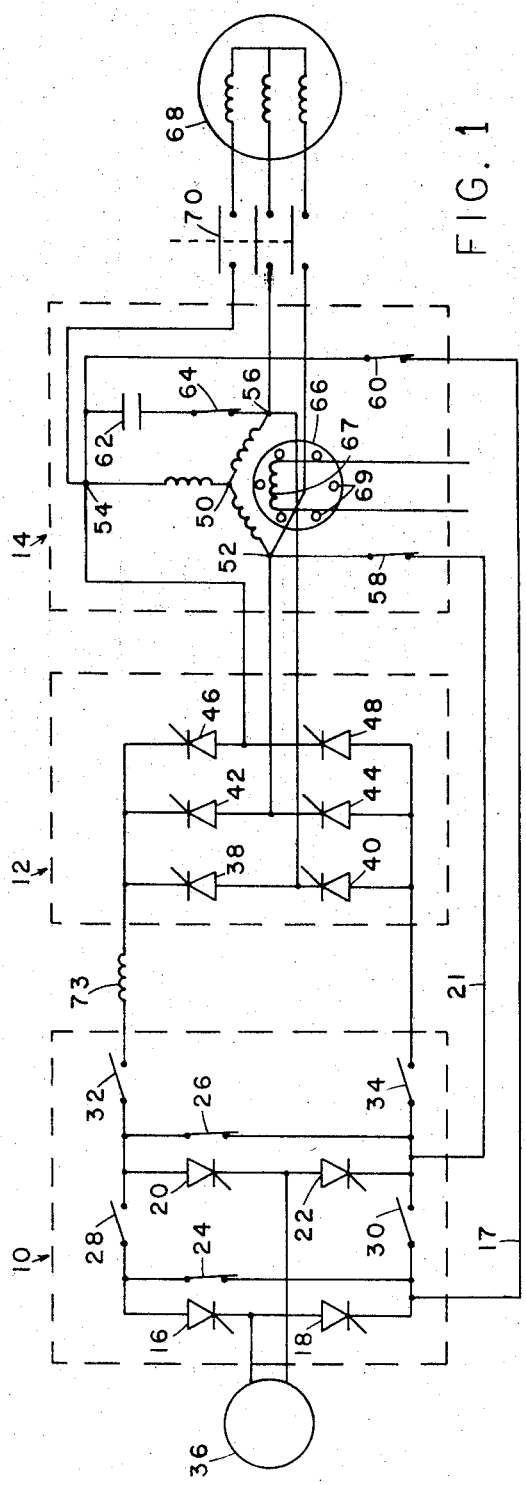
FIG. 1 is a circuit diagram of the self-starting power converter in the starting mode when supplied by a single-phase AC voltage.
Figure 2:
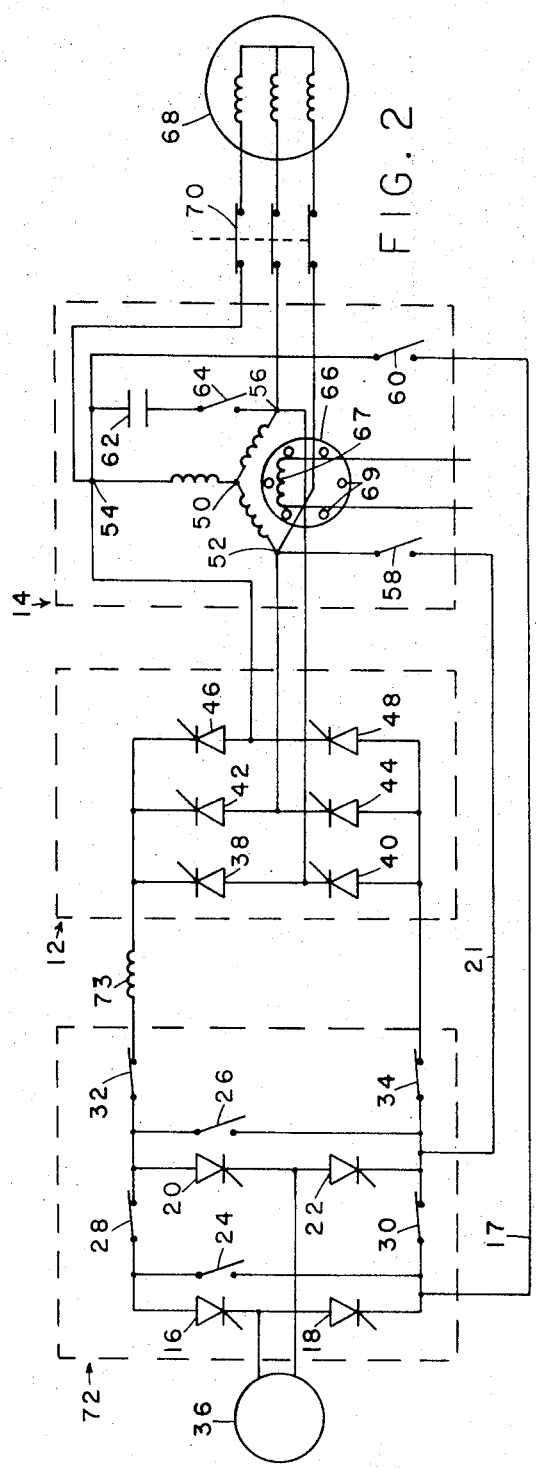
FIG. 2 is a circuit diagram of the self-starting power converter of FIG. 1 in the running mode.

The self-starting power converter of the present invention can be operated from either a single-phase or three-phase AC power supply. FIGS. 1 and 2 illustrate the converter when supplied by a single-phase voltage.

The power converter in the starting mode of FIG. 1 essentially comprises an AC regulator 10, inverter 12, and synchronous condenser 14. The AC regulator 10 includes antiparallelly connected thyristors 16 and 18 and antiparallelly connected thyristors 20 and 22. The antiparallel connections are achieved by closing switches 24 and 26. Switches 28, 30, 32 and 34 remain open during the starting mode to achieve antiparallel thyristor connection and to eliminate the inverter 12 from the starting mode circuitry. A commercial frequency, constant voltage single-phase AC power supply 36 provides power to the AC regulator 10.

The three-phase full wave inverter 12 including bridge connected thyristor pairs 38 and 40, 42 and 44, 46 and 48, is not connected to the AC regulator 10 during starting mode with switches 32 and 34 open. The leads 17 and 21 from the antiparallelly connected thyristors of the AC regulator 10 are connected to the three-phase windings 50 of the synchonous condensor 14. Line 21 is connected to winding terminal 52 through switch 58 while line 17 is connected to winding terminal 54 through switch 60 and to winding terminal 56 through capacitor 62 and switch 64. Switches 58, 60, and 64 are closed during the starting mode of the power converter. The synchronous condenser rotor 66 includes a field excitation winding 67 and a damper cage 69. An induction motor 68 is connected to the winding 50 through the switch 70. During the starting mode, the switch 70 remains open thus disconnecting the induction motor 68.

In the running mode illustrated in FIG. 2, the AC regulator has been reconnected to function as a phase delay rectifier 72 by bridge connecting the thyristors 16, 18, 20 and 22. This is accomplished by opening switches 24 and 26 while correspondingly closing switches 28, 30, 32 and 34. The inverter 12 is brought into the circuit after opening switches 58, 60 and 64. A smoothing reactor 73 can be connected between the phase delay rectifier 72 and inverter 12. The motor 68 is connected by closing switch 70.

The self-starting power converter can be operated with commercially available power fed to the AC regulator 10. In the starting mode of FIG. 1, by controlling the firing angle of the thyristors 16, 18, 20, and 22 in the AC regulator 10, the voltage available at the synchonous condenser winding terminals 52, 54 and 56, can be varied from esentially zero to the desired reduced voltage value.

The reduced voltage is necessary to limit current inrush to the asynchronously starting synchronous condenser. A starting torque for the synchronous condenser 14 is developed by the phase shift to the winding 50 provided by capacitor 62 and the interaction of the rotating magnetic field in winding 50 with current induced in damper cage 69. The starting torque requirement is quite small since it has only to overcome minimum winding and friction losses with the induction motor 68 not yet connected. It should be understood that synchronous condenser 14 and induction motor 68 are not connected mechanically.

DC excitation is next applied to the field of the winding 50 by the DC excitation coil 67 which synchronizes the condenser with the commercial frequency power supply 36. The starting process is completed by reconnecting the AC regulator 10 into a phase delay rectifier 72 and discontinuing the current flow to the synchronous condenser 14 through lines 17 and 21 as shown in FIG. 2.

The rearrangement of the circuitry in the running mode of FIG. 2, which brings the inverter 12 into the circuit, can be accomplished by opening and/or closing the requisite switches, as indicated, without interrupting any large currents. This is accomplished by discontinuing the firing of thyristors 16, 18, 20, and 22. This action naturally commutates off those thyristors from supply 36 and after the commutation process current ceases to flow in leads 17 and 21. Once rearranged, the circuit is ready to operate as a synchronously commutated inverter. Although no current is as yet flowing in the synchronous condenser, the DC field excitation produces an armature voltage since the kinetic energy maintains its rotation. As soon as thyristor gate drive signals are applied to the phase delay rectifier and to the inverter, current starts to flow through them, and the synchronous condenser voltage will sustain commutation of the inverter. The variable voltage, variable frequency, three-phase reactive power output from the synchronous condenser is fed to the induction motor which has been connected by closing switch 70.

The power converter will thus efficiently and economically provide a variable speed capability for the induction motor. Speed control of the motor can be easily accomplished by several convenient methods.

The self-starting power converter can also be supplied with power from commercial, three phase, AC sources as illustrated in FIGS. 3 and 4. Very little change is required to the single-phase fed converter of FIGS. 1 and 2.

In the starting mode, the three-phase AC power supply 74 provides power to an AC regulator 76 which includes 3 pairs of antiparallelly connected thyristors 78 and 80, 82 and 84, and 86 and 88. This configuration is achieved by closing switches 90, 92, and 94 and opening switches 96 and 98, 100 and 102, and 104 and 106. The inverter 108 having three-phase full wave, bridge connected thyristor pairs 110 and 112, 114 and 116 and 118 and 120 is inoperative with switches 104 and 106 open.

The three AC regulator output leads 122, 124 and 126 are connected to the three terminals 128, 130, 132 of the condenser winding 134 in the synchronous condenser 136. Leads 122, 124 and 126 include switches 138, 140 and 142 respectively. The synchronous condenser rotor 144 includes field excitation winding 148 and damper cage 146. An induction motor 150 is connected to the winding through switch 152 which is open during the starting mode.

In the running mode illustrated in FIG. 4, the switches 96, 98, 100, 102, 104, 106 and 152 are closed while the switches 90, 92, 94, 138, 140 and 142 are open. This converts the thyristors 78, 80, 82, 84, 86 and 88 into a bridge network to form a phase delay rectifier 154. Also, the inverter 108 including smoothing reactor 155 and induction motor 150 are connected into the circuitry. The start up and operation of the three-phase fed converter is essentially identical to that of the single-phase fed converter which has already been described.

While the above described self-starting power converters have many useful applications, they are particularly advantageous for use with linear induction motor (LIM) ground transportation vehicles. The converters of the present invention convert commercial, constant voltage, wayside power, either single or three phase into variable voltage, variable frequency three-phase power. The synchronous condenser not only provides reactive power to the LIM but also assists in the operation of the converter.

With commercial wayside power, the cost of electrification is nominal and the equipment required is less costly and less complex. The on-board synchronous condenser permits a smaller electric power system on the wayside than other proposed converters. The variable voltage, variable frequency output provides smooth vehicle speed control at all thrust and speed levels during acceleration breaking and cruising. Of course the greatest advantage is the self-starting capability of the converter.

What is claimed is:

1. A self-starting power converter comprising:
   inverter means;
   synchronous condenser means operably associated with said inverter means;
   thyristor circuit means operably associated with said inverter means and said synchronous condenser means to function as AC regulator means during starting of the power converter and as rectifier means during operation of the power converter; and
   switching means operably associated with said thyristor circuit means to control the function of said thyristor circuit means between AC regulator means during starting and phase delay rectifier means during operation.

2. The self-starting power converter of claim 1 wherein said inverter means comprises a thyristor bridge circuit.

3. The self-starting power converter of claim 1 wherein said synchronous condenser means includes a three-phase winding, DC excitation means, and a damper cage.

4. A self-starting power converter comprising:
   an AC power supply;
   a thyristor circuit operably connected to said power supply to receive power therefrom and to function as an AC regulator during start-up of the power converter;
   a synchronous condenser operably connected to said AC regulator during start-up of the power converter to receive a reduced voltage therefrom to start-up asynchronously and to become synchronized therewith, said synchronous condenser to develop reactive power;
   switching means operably associated with said thyristor circuit and said synchronous condenser to disconnect said thyristor circuit from said synchronous condenser after start-up and to reconnect said thyristor circuit to function as a rectifier; and
   a thyristor bridge circuit inverter operably connected to said synchronous condenser to be synchronously commutated by said synchronous condenser, said inverter operably connected after start-up to said thyristor circuit rectifier to receive a variable voltage DC input therefrom.

5. The self-starting power converter of claim 4 and in addition a smoothing reactor operably connected between said phase delay rectifier and said thyristor bridge circuit inverter.

6. The self-starting power converter of claim 4 and in addition an induction motor operably connected to said synchronous condenser and said inverter to receive reactive power and real power therefrom.

7. The self-starting power converter of claim 4 wherein said AC power supply is single phase.

8. The self-starting power converter of claim 4 wherein said AC power supply is three phase.

9. The self-starting power converter of claim 4 wherein said synchronous condenser includes a three-phase winding, a DC excitation coil, and a damper cage.

10. A self-starting power converter comprising:
an AC power supply;
an antiparallelly connected thyristor circuit AC regulator operably connected to said power supply to receive power therefrom;
a synchronous condenser operably connected to said AC regulator to receive a reduced voltage therefrom to start up asynchronously and to become synchronized therewith and to develop reactive power;
a thyristor bridge circuit inverter operably connected to said synchronous condenser to receive reactive power therefrom;
switching means operably associated with said antiparallelly connected thyristor circuit AC regulator, said switching means operative after start-up of the power converter to disconnect the antiparallel circuit connection and reconnect the thyristor circuit into a thyristor bridge circuit phase delay rectifier, to operably connect said phase delay rectifier to said inverter, and to disconnect said synchronous condenser from said phase delay rectifier; and
an induction motor operably connected to said synchronous condenser and said inverter to receive reactive power and real power therefrom.

References Cited

UNITED STATES PATENTS

| | | | |
|---|---|---|---|
| 2,809,342 | 10/1957 | Shrider et al. | 323—124XR |
| 3,325,716 | 6/1967 | Gomi | 321—2 |
| 3,418,560 | 12/1968 | Petersen | 321—47 |
| 3,430,123 | 2/1969 | Corry et al. | 318—227 |
| 3,444,451 | 5/1969 | Schlabach et al. | 318—227 |

WILLIAM M. SHOOP, JR., Primary Examiner

U.S. Cl. X.R.

318—227; 321—5; 323—102